US005485588A

United States Patent [19]
Singh

[11] Patent Number: 5,485,588
[45] Date of Patent: Jan. 16, 1996

[54] MEMORY ARRAY BASED DATA REORGANIZER

[75] Inventor: Shanker Singh, Morgan Hill, Calif.

[73] Assignee: International Business Machines Corporation, Armonk, N.Y.

[21] Appl. No.: 995,400

[22] Filed: Dec. 18, 1992

[51] Int. Cl.⁶ .............................. G06F 12/00; G06F 13/00
[52] U.S. Cl. .................... 395/405; 395/482; 395/421.01; 395/600; 364/DIG. 1
[58] Field of Search .................................. 395/400, 425; 365/230.03

[56] References Cited

U.S. PATENT DOCUMENTS

| | | | |
|---|---|---|---|
| 3,593,304 | 7/1971 | Gardner et al. | 395/425 |
| 3,812,336 | 5/1974 | Bossen et al. | 371/2.2 |
| 3,897,626 | 8/1975 | Beausoleil | 437/8 |
| 4,461,001 | 7/1984 | Bossen et al. | 371/11.1 |
| 4,511,962 | 4/1985 | Machida et al. | 395/425 |
| 4,561,072 | 12/1985 | Arakawa et al. | 365/230.03 |
| 4,773,048 | 9/1988 | Kai | 365/230.04 |
| 4,835,684 | 5/1989 | Kanai | 395/425 |
| 4,943,947 | 7/1990 | Kobayashi | 365/230.03 X |
| 5,138,705 | 8/1992 | Lo et al. | 395/425 |

OTHER PUBLICATIONS

Tong, "Memory Transfer at Arbitrary Bytes Boundaries," IBM Technical Disclosure Bulletin, vol. 26, No. 12, May 1984, pp. 6473–6475.

Primary Examiner—Michael A. Whitfield
Attorney, Agent, or Firm—F. E. Anderson

[57] ABSTRACT

Memory system for internally rearranging fields in database records. The memory is separated into modules, each module separately addressable. Each memory module is addressed by selectively modifying a supplied address, for example by the output from exclusive-OR gates, having inputs from the address supplied to the memory system and another inputs from address modification registers. The address modification registers are selectively set by the external utilization device to permit reading different rows in the memory modules. The data output columns from the memory modules can be rearranged using selector devices such as demultiplexors. Data can be masked by precluding certain selector control signals.

3 Claims, 2 Drawing Sheets

MEMORY ARRAY BASED DATA REORGANIZER

BACKGROUND AND SUMMARY OF THE INVENTION

This invention relates to memory devices, particularly to memory devices that can reorganize the data by permuting rows or columns or both. It may be composed of plural memory modules viewed by the processor as a single, nonseparable store. More particularly, it relates to addressing such memory devices such that the processor can selectively modify the address to each module.

The invention provides a memory capable of formatting data before returning it to a processor or writing it back into memory by rearranging rows and columns of data stored in the memory. This is performed faster than a processor can manipulate the same data. The invention can be viewed as altering table structures semantically. It is useful especially in relational database management and uses hardware logic that is independent from the processor so that database management operations can be efficaciously executed off-line, replacing the software that normally performs such operations. It also provides the capability to mask certain data for security reasons, e.g., does not supply data that a user is not authorized to access.

The available techniques for relational database management require several memory accesses to retrieve requested data. The more fields in a record and the more dispersed the requested fields, the more memory read cycles required.

The prior art shows memory arrangements that can modify the data inside the memory per se using logic operations that can be performed without first retrieving the data and then having to restore the result.

U.S. Pat. No. 3,157,778 shows a memory that transfers data from register to register within the memory device and is capable of operating on information within the memory device, e.g., read and increment and return to the same or several registers. Apparently, the memory capacity can be changed by increasing or decreasing the number of registers or the number of storage positions in each register. The construction is directed to cryogenic techniques.

U.S. Pat. No. 3,247,489 show a memory in which logical operations are performed on data within the memory device without having to retrieve the data. The results can be transferred to external devices, returned to memory, or both. The circuits, disclosed as cryogenic, can simultaneously read, perform a logic operation, and write data by using more than one read and sense line per cell.

U.S. Pat. No. 3,500,341 teaches semiconductor memory stages that perform storage or logical functions. It uses transistor bistable circuits in monolithic arrays and is arranged so that one of the transistors will pass a signal if the other transistor is turned off.

U.S. Pat. No. 3,593,304 teaches a memory that performs logical operations by combining two or more words in a single memory location. Each byte position includes a gate connected to different pairs of adjacent byte lines and produces a signal on one conductor when the signal level on the other exceeds a predetermined value. The byte wires are arranged so the signals add linearly and create carries or propagates via threshold gates, i.e., majority logic gates for each bit position.

U.S. Pat. No. 3,699,534 discloses cellular arithmetic array memories acting as multiprocessors. The invention relates to logic circuits for operating on words while stored in the memory. The circuits can read out, write in, or increment, e.g., an address, during each clock cycle.

U.S. Pat. No. 4,823,257 teaches a processor coupled to several so-called smart memories, i.e., including small scale arithmetic-logic units, which act as coprocessors that prepare data for the processor. By performing such operations—different ALU operations from the host's—and being linked by common intermediate language codes, the number of accesses to a memory is reduced. The results are translated back to intermediate code for the processor. The common intermediate language appears to be the crux of the invention.

For performing simple, low level logical operations on stored data, the prior art is satisfactory. The prior art, however, does not teach the rearrangement of data, using dynamic memory modification under processor control so that a single read (or write) operation that can retrieve (or store) fields of different records from each module even though stored at different addresses.

The invention provides fast retrieval from relational database memories since the addresses can be modified to do in a single memory read that which presently requires several memory reads. It is especially useful in database systems as the systems increase in size and capability.

In accordance with the invention, a memory is made up of several modules addressed as a single unit. Each module has circuits to modify its address selectively. The data read or written at the addressed locations can be selectively rearranged.

Since the registers controlling the address modification logic can be set by the processor an order of magnitude or two faster than a memory cycle, a plurality of selected fields can be accessed in one memory cycle vice several accesses, one for each field at a different address.

BRIEF DESCRIPTION OF THE DRAWING

The invention is described in detail by referring to the various figures which illustrate specific embodiments of the invention, and wherein like numerals refer to like elements.

DESCRIPTION OF THE PREFERRED EMBODIMENT

The invention is a memory system with a plurality of storage modules, each having an independent input address. The actual address to each memory module is a combination of the address supplied from a computer or other utilization device and preset address modification registers. The utilization device can rapidly set the address modification registers. The address modification can be separately controlled for each memory module.

The retrieved data can be supplied to a system bus or regenerated, i.e., written back into the memory. The retrieved data can also be rearranged before supplied to a system bus or being regenerated. The reading process rearranges both rows and columns of data.

Figure 1:
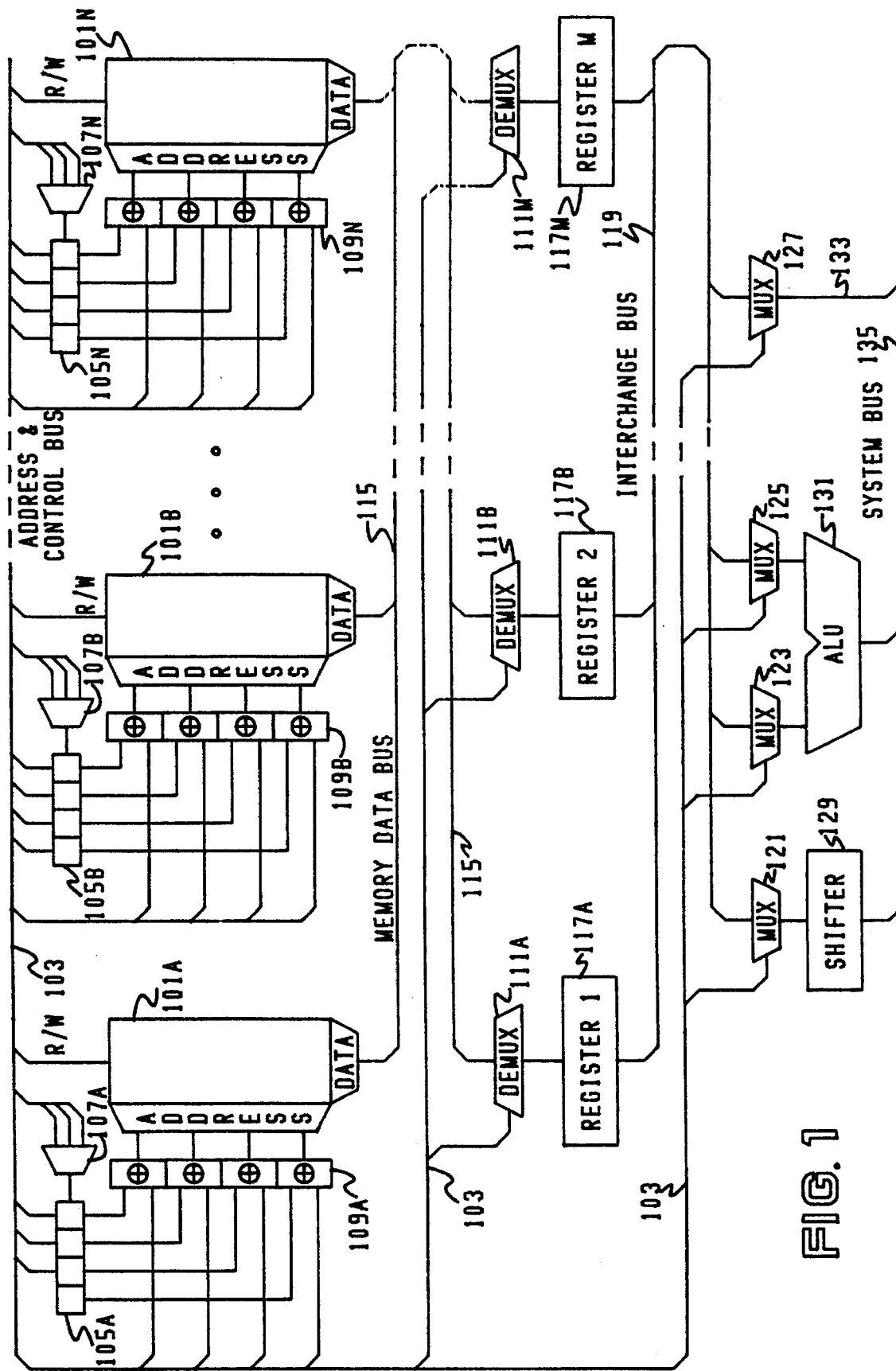
FIG. 1 is a logic block diagram of a memory system employing the invention.

In FIG. 1, a plurality of memory modules 101A, 101B, . . ., 101N (collectively 101) have address input terminals and data access terminals. In a read mode (controlled by a R/W signal), data accessed from addressed locations in each memory module is made available at the data access terminals. In a write mode, data at the data access terminals can be rewritten at addressed locations, either at the same address from which it was retrieved or at a different address. For illustrative purposes, the memory modules are shown as having four address input terminals which can address sixteen memory locations in each module. The illustrated embodiment can be expanded to any desired size of memory module and to any number of memory modules.

The input signals to the address terminals of the memory modules 101 are supplied by an address and control bus via Exclusive-OR (XOR) gate networks 109A, 109B, . . . , 109N (collectively 109).

The other input signal to each of the exclusive-OR gates 109 is supplied from address modification registers 105A, 105B, . . . , 105N (collectively 105). The contents of the address modification registers 105 are set from the address and control bus 103 and controlled by decoders 107A, 107B, . . . , 107N (collectively 107). A decoder may be an AND gate having as input signals a unique combination of signals and an activating signal from the address and control bus 103.

Prior to addressing the memory modules 101, the address modification registers are set by supplying the modification data and the control signals via the bus 103. The register groups 105 can be set individually or several at a time depending on the width (number of lines, each conducting the value of one bit) of the address and control bus 103.

When the memory modules 101 are addressed to access (read or write) data, addressing signals from a computer or other utilization device are supplied via the address and control bus 103 to the exclusive-OR gates 109 and gated or inverted by the contents of the address modification registers 105 to supply modified address signals to the memory modules 101.

Figure 2:
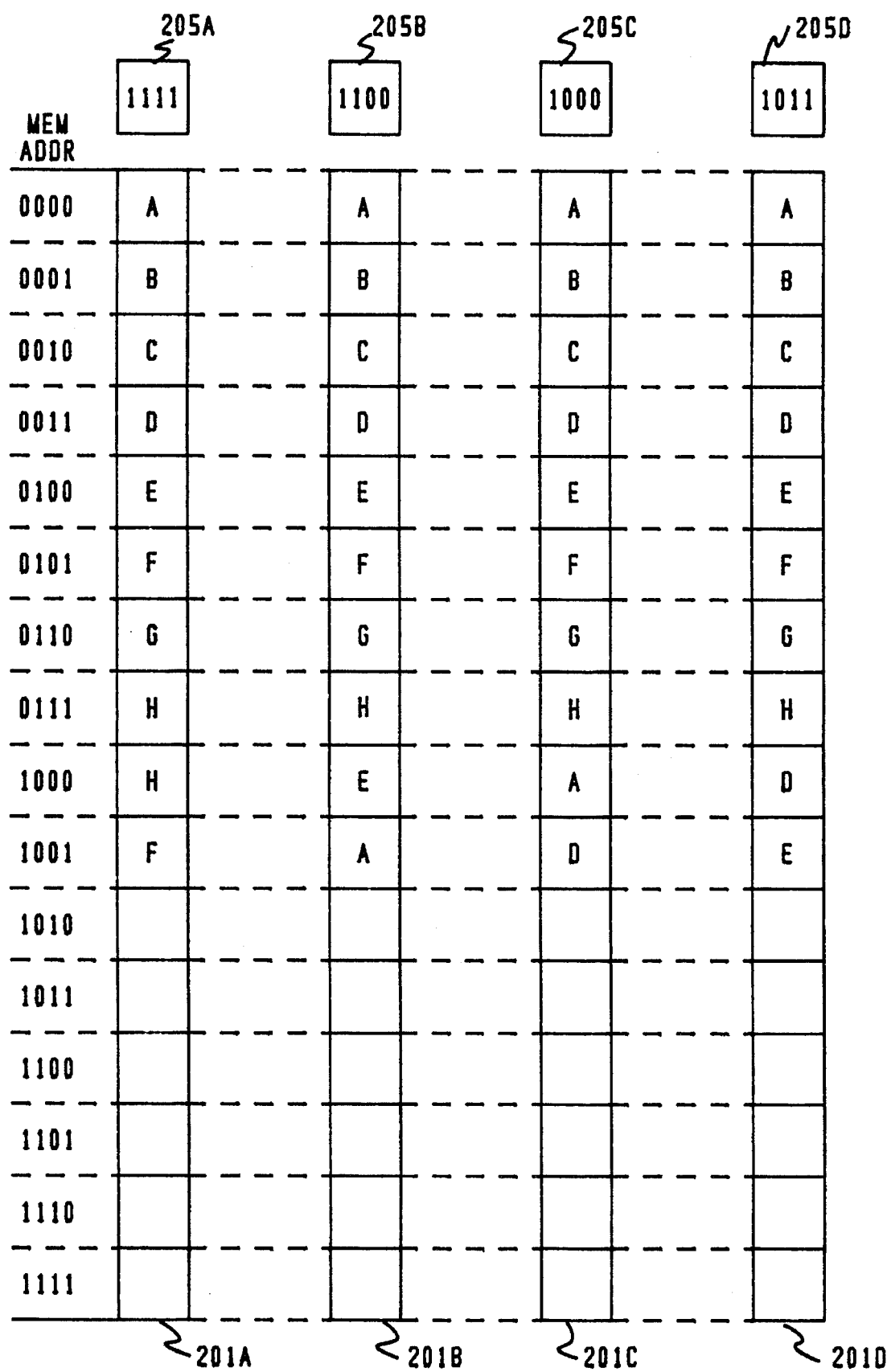
FIG. 2 is an illustration of the functional operation of a memory system according to the invention.

Data retrieved from the memory modules can be written back into the memory from the data access terminals or from memory registers 117. An illustration of the usefulness of rewriting rearranged retrieved is shown in FIG. 2. The operation is illustrated using letters to represent record fields.

In FIG. 2, each of four memory modules 201A, 201B, 201C, and 201D, have sixteen addressable locations specified by four address bits. Initially, the modules store the letters A through H in locations 0000 to 0111.

As an example, it is desired to store at address 1000 a sequence of records represented by the letters HEAD. Instead of eight memory cycles to read out and to rewrite each separate record, the invention permits setting the address modification registers 205A, 205B, 205C, and 205D (collectively 205) to values which will be exclusive-ORed with a supplied memory address.

The sequence of operations starts by setting the address modification registers 205. The address modification register 205A which modifies the address to the first memory module 201A is set to a value 1111. The second address modification register 205B, which modifies the address to the second memory module 205B, is set to 1100. The third and fourth address modification registers 205C and 205D are set to 1000 and 1011, respectively.

Next, the memory is addressed with a supplied address of 1000, which when exclusive-ORed with the contents of the address modification registers 205 results in an address input of 0111 to the first memory module 201A, 0100 to the second memory module 201B, 0000 to the third memory module 201C, and 0011 to the fourth memory module 201D.

From the first module, an H is retrieved since 1000 (the supplied address) exclusive-ORed with 1111 (contents of the first address modification register 205A) is 0111, the address of record H. From the second, third, and fourth memory modules, E, A, and D are retrieved, respectively. The data access terminals therefore register HEAD.

The next step resets the address modification registers to 0000 which can be done with a special reset control line or by writing 0000 into each address modification register.

The memory is then addressed again with 1000, and the retrieved data is written to location 1000.

A second cycle of operations can be performed to read FADE into location 1001 by setting the address modification registers to 1100, 1001, 1010, and 1101 in order and supplying an address of 1001. The preceding sequence of operations is then executed to place FADE in location 1001.

As previously noted, the data can be written into the memory from data registers 117 (FIG. 1).

Data from the memory modules 101 can be coupled to a memory data bus 115 and gated to the data registers 117A, 117B, . . . , 117M (collectively 117) via demultiplexors 111A, 111B, . . . , 111M (collectively 111). Demultiplexors (a.k.a. selectors) have a plurality of inputs, one of which is gated to the output terminals depending on the value of control input signals. There are M demultiplexors (and data registers) illustrated in FIG. 1 to show that the number need not equal the number of memory modules, N. Practically, however, M would equal N. Several demultiplexors in parallel, having the same control input signals, are coupled to the data bus 115 to pass an entire record to a data register 117.

For example, if each storage location in the memory modules 101 contain eight bits (byte) and there are four memory modules (205A–205D in FIG. 2), the data bus would be 32 bits wide. Each of the data registers 117 would have eight latches. Eight parallel demultiplexors, each with four inputs and its output terminal coupled to one of the latches in a data register, would supply the data to the data register.

Each demultiplexor would have two control inputs to select which of its four input terminals would be coupled to its output terminal and gated into the data register latch.

The demultiplexors 111 are activated by signals on the address and control bus 103 to select the data read into the data registers 117 from the data bus 115.

By controlling the demultiplexors 111, the data of the example in FIG. 2 can be selectively rearranged. Setting the first demultiplexor to pass the fourth character (signals on the data bus 115 from a fourth memory module), the second demultiplexor to pass the fourth character, the third demultiplexor to pass the second character, and the fourth demultiplexor to pass the first character will set the data registers to DEAF. This has rearranged the rows. The data can then be rewritten into the memory or supplied to the system bus 135 for use by an external utilization device.

By precluding certain combinations of demultiplexor control signals, data can be masked.

The contents of the data registers 117 can coupled via an interchange bus 119 to demultiplexors, one of which is a demultiplexor 121 that gates data into a shifter 129 from the interchange bus 119. Another is a demultiplexor 127 which couples data directly to a system bus 135. Others are a demultiplexor 123 and a demultiplexor 125 that couple data to an arithmetic-logic unit (ALU) 131 to manipulate retrieved data according to system operations and to output the result to the system bus 135. The data manipulation devices are those commonly utilized in a processing systems.

The system bus couples data between the memory system and a computer or other utilization device.

While the invention has been particularly shown and described with reference to a preferred embodiment thereof, it will be understood by those skilled in the art that various changes and modifications in form and details may be made therein without departing from the spirit and scope of the invention according to the following claims.

What is claimed is:

1. A method for rearranging data in a memory, the memory comprising a plurality of separately addressable memory modules, said method comprising steps of:

setting a plurality of modification values, one modification value associated with each memory module;

supplying an address to the memory;

modifying the supplied address by each modification value;

accessing data from each memory module by an associated modified address;

changing the plurality of modification values such that each supplied address is re-modified; and writing said accessed data back to the memory at new locations according to the re-modified addresses.

2. The method claimed in claim 1 including additional steps of:

retrieving data from addressed locations in each memory module; and rearranging the order of data retrieved.

3. The method claimed in claim 1 wherein the modifying step includes exclusive-ORing the supplied address with the modification values.

* * * * *